(12) United States Patent
Hartwick

(10) Patent No.: US 7,220,176 B2
(45) Date of Patent: May 22, 2007

(54) SYSTEM AND METHOD FOR PRODUCTION OF EXACT WEIGHT GROUND MEAT

(75) Inventor: Ty Albert Hartwick, Sioux City, IA (US)

(73) Assignee: Tyson Fresh Meats, Inc., Springdale, AR (US)

( * ) Notice: Subject to any disclaimer, the term of this patent is extended or adjusted under 35 U.S.C. 154(b) by 0 days.

(21) Appl. No.: 10/708,439

(22) Filed: Mar. 3, 2004

(65) Prior Publication Data

US 2005/0227602 A1    Oct. 13, 2005

(51) Int. Cl.
*A22C 11/00* (2006.01)

(52) U.S. Cl. ..................................... 452/30
(58) Field of Classification Search ............... None
See application file for complete search history.

(56) References Cited

U.S. PATENT DOCUMENTS

| | | |
|---|---|---|
| 3,977,483 A | 8/1976 | Greanias |
| 4,074,507 A | 2/1978 | Ruf et al. |
| 4,165,818 A | 8/1979 | Bernard |
| 4,268,532 A | 5/1981 | Bernard |
| 4,338,702 A | 7/1982 | Holly |
| RE31,857 E | 4/1985 | Holly |
| 4,530,132 A | 7/1985 | Wagner |
| 4,648,153 A | 3/1987 | Coroneos |
| 4,720,961 A | 1/1988 | Jordan |
| 4,905,348 A | 3/1990 | Powers et al. |
| 5,071,326 A | 12/1991 | Wright et al. |
| 5,159,959 A | 11/1992 | Bohm |
| 5,177,938 A | 1/1993 | Mayersbeth |
| 5,207,351 A | 5/1993 | Lesar |
| 5,365,722 A | 11/1994 | Edwards et al. |
| 5,481,466 A | 1/1996 | Carey |
| 5,787,687 A | 8/1998 | Mueller et al. |
| 5,890,342 A | 4/1999 | McDonald et al. |
| 6,245,369 B1 * | 6/2001 | Kobussen et al. ......... 426/231 |
| 6,290,591 B1 * | 9/2001 | Hergott et al. ............. 452/51 |
| 6,419,968 B1 * | 7/2002 | Wang et al. ............... 426/277 |
| 6,635,301 B1 * | 10/2003 | Howsam ................... 426/574 |
| 6,645,063 B1 * | 11/2003 | Volkl ........................ 452/149 |
| 6,740,349 B2 * | 5/2004 | Franklin et al. .......... 426/513 |
| 6,932,688 B2 * | 8/2005 | Stanley et al. ............ 452/48 |
| 6,932,998 B2 * | 8/2005 | LaBruno et al. ........... 426/513 |
| 6,942,888 B2 * | 9/2005 | Mueller ..................... 426/516 |

FOREIGN PATENT DOCUMENTS

EP    1 020 261 A2    7/2000

* cited by examiner

*Primary Examiner*—Thomas Price
(74) *Attorney, Agent, or Firm*—Blackwell Sanders Peper Martin LLP; Mark E. Stallion

(57) ABSTRACT

A method and system for producing portions of ground meat having a predetermined target weight is disclosed. This system includes a pump assembly that is capable of extruding a stream of ground meat, a conveyor that is capable of transporting the stream of ground meat from the pump assembly, a portioning mechanism that is capable of separating the stream of ground meat into a plurality of portions, a weighing mechanism that is capable of weighing each portion of the plurality of portions, and at least one filling mechanism that provides an additional amount of ground meat to each portion of the plurality of portions so that each portion of the plurality of portions can substantially attain the predetermined target weight.

24 Claims, 13 Drawing Sheets

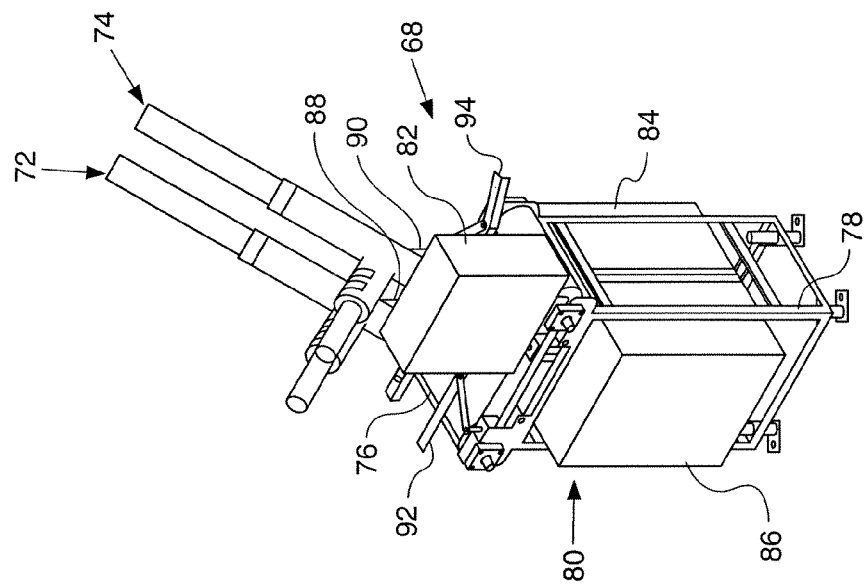
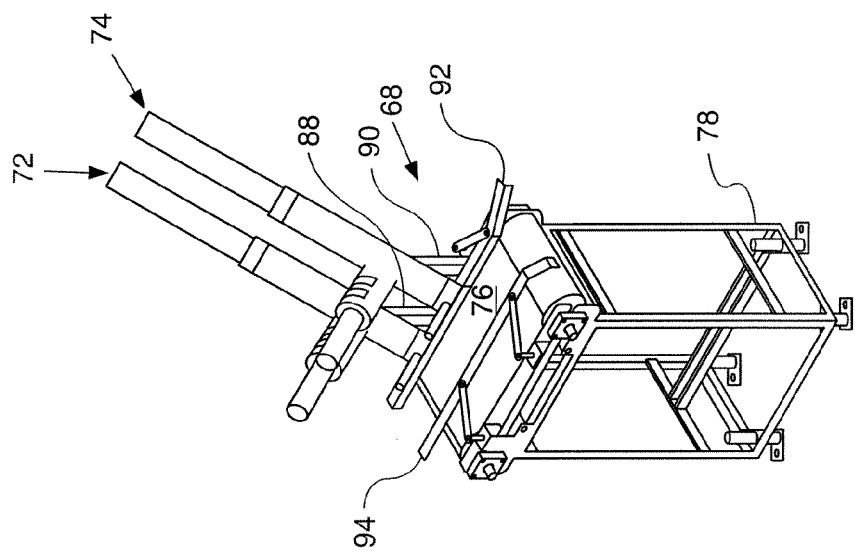

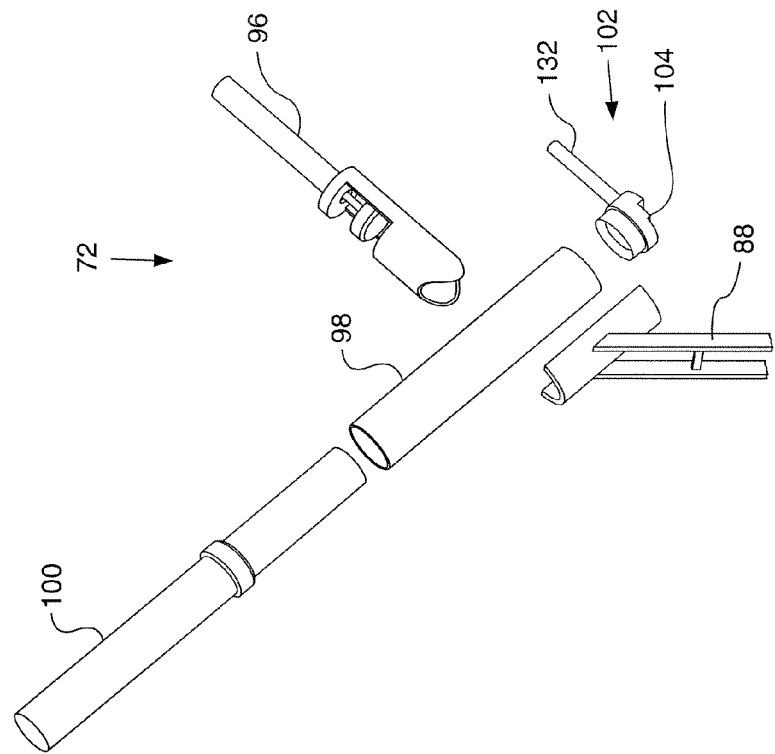
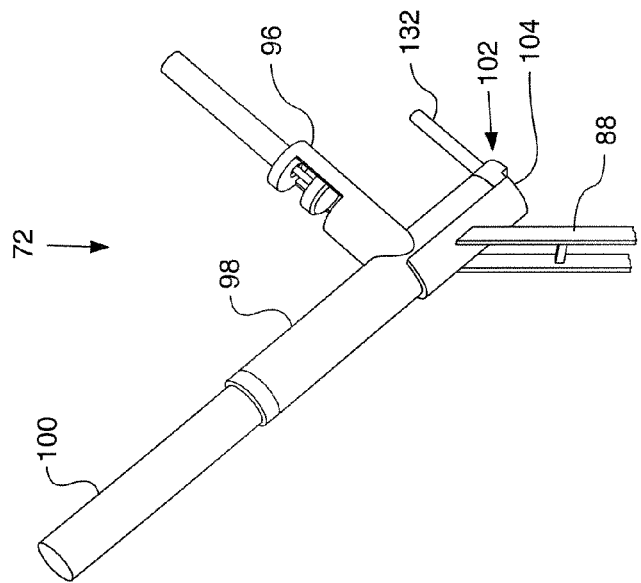

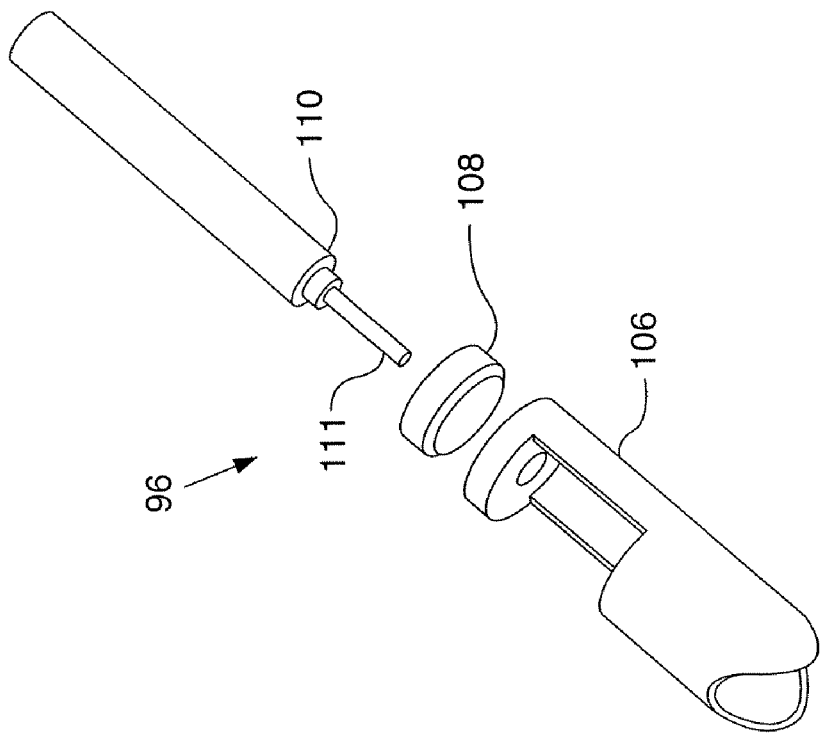
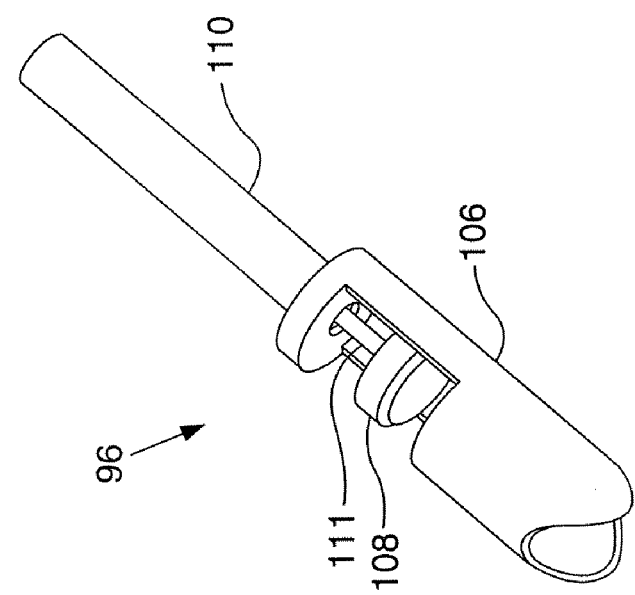

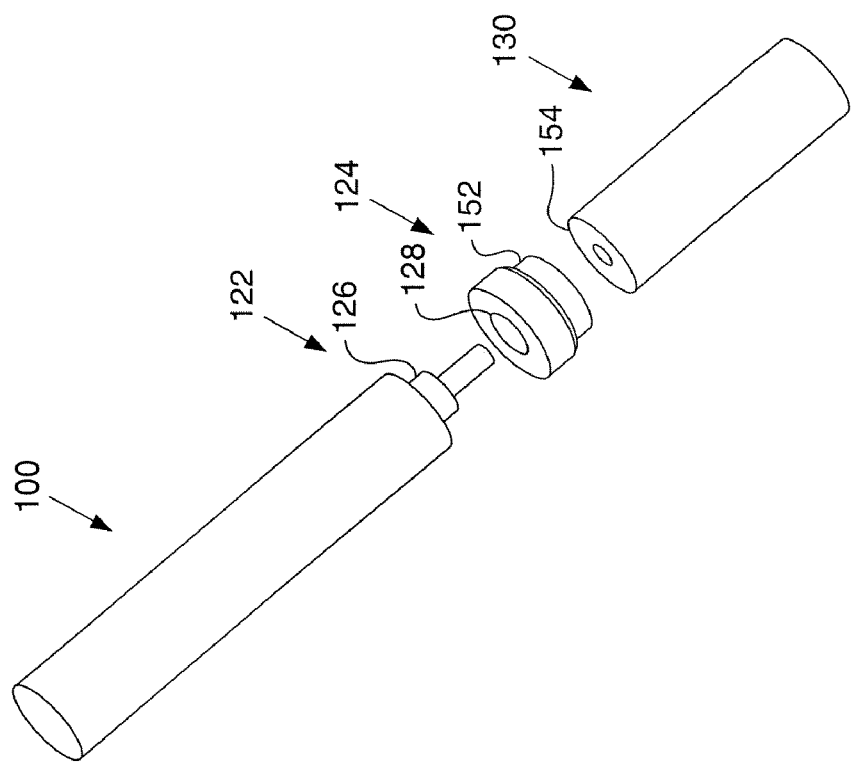
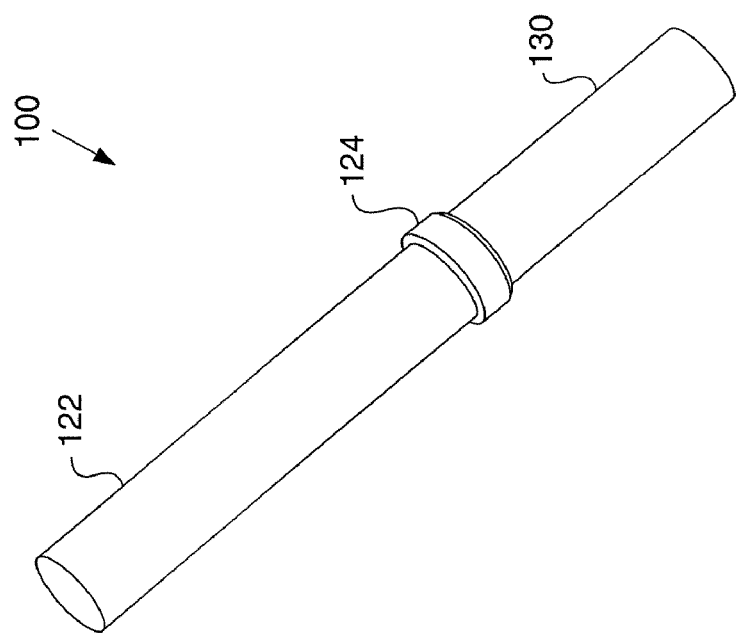

SYSTEM AND METHOD FOR PRODUCTION OF EXACT WEIGHT GROUND MEAT

BACKGROUND OF INVENTION

The production of ground meat is currently accomplished with a net weight system. A net weight system is where the ground meat product is produced at a target weight that deviates based on the limitations found in the current processes and equipment. A catch weight is calculated by weighing the package and printing a label on top of the package that indicates the weight of the ground meat that is actually in the package. Therefore, each package can weigh a different amount and the pricing label is calculated by the price per weight. This variability in each package produced creates problems such as the need for individualized packaging, the amount of ground meat product that needs to be kept in inventory and the ability to market a consistent quantity of product to the consumer.

An exact weight production of ground meat product would provide many benefits to the manufacturer, retailer, and consumer. However, an exact weight product is not capable of being realized at the current time due to inconsistency of the product, speed of production and limitations of the current equipment and processes. Currently, when an exact weight product is requested, the product needs to be at least the target weight or greater and is packaged as to indicate that the product is exactly the target weight. Any overage from the target weight is given to the customer at no additional charge, which results in a very significant expense. Consequently, target weight packaging is currently a very impractical and costly process.

The present invention is directed to overcoming one or more of the problems set forth above.

SUMMARY OF INVENTION

In another aspect of the present invention, a system for producing portions of ground meat having a predetermined target weight is disclosed. This system includes a pump assembly that is capable of extruding a stream of ground meat, a conveyor that is capable of transporting the stream of ground meat from the pump assembly, a portioning mechanism that is capable of separating the stream of ground meat into a plurality of portions, a weighing mechanism that is capable of weighing each portion of the plurality of portions, and at least one filling mechanism that provides an additional amount of ground meat to each portion of the plurality of portions so that each portion of the plurality of portions can substantially attain the predetermined target weight.

In one aspect of the invention, a process for producing portions of ground meat having a predetermined target weight is disclosed. This process includes extruding a stream of ground meat with a pump assembly, transporting the stream of ground meat from the pump assembly with a conveyor, separating the stream of ground meat into a plurality of portions with a portioning mechanism, weighing each portion of the plurality of portions with a weighing mechanism, and providing an additional amount of ground meat to each portion of the plurality of portions with at least one filling mechanism so that each portion of the plurality of portions can substantially attain the predetermined target weight.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which:

FIG. 8 is a perspective view of a filling mechanism, with electronic control mechanisms removed, in accordance with the present invention;

FIG. 9 is a perspective view of a filling mechanism, as shown in FIG. 8, with the addition of electronic control mechanisms, in accordance with the present invention;

FIG. 10 is a perspective view of an individual filling device associated with the filling mechanism in accordance with the present invention;

FIG. 11 is an exploded view of the individual filling device, as shown in FIG. 10, associated with the filling mechanism in accordance with the present invention;

FIG. 12 is a perspective view of a supply press assembly associated with the filling mechanism in accordance with the present invention;

FIG. 13 is an exploded view of the supply press assembly, as shown in FIG. 12, associated with the filling mechanism in accordance with the present invention;

FIG. 15 is a perspective view of a secondary press assembly associated with the filling mechanism in accordance with the present invention;

FIG. 16 is an exploded view of the secondary press assembly, as shown in FIG. 15, associated with the filling mechanism in accordance with the present invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures and compartments have not been described in detail so as to obscure the present invention.

Figure 1:
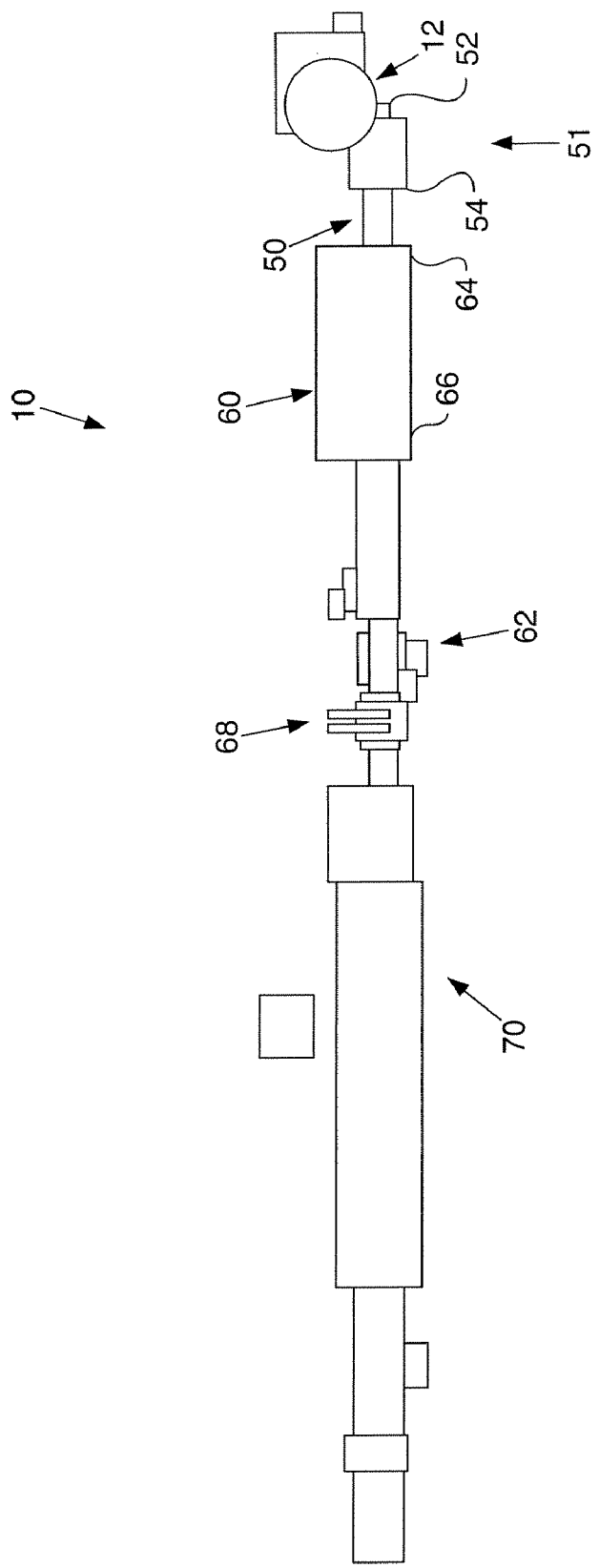
FIG. 1 is a perspective view of a line for a production of exact weight, ground meat products in accordance with the present invention.

Referring now to FIG. 1, an illustrative, but nonlimiting, a production line for the processing of exact weight, ground meat products of the present invention is generally indicated by numeral 10. The first part of the process includes a pump assembly that is generally indicated by numeral 12. The pump assembly 12 is for the purpose of creating a constant stream of ground meat product.

Figure 2:
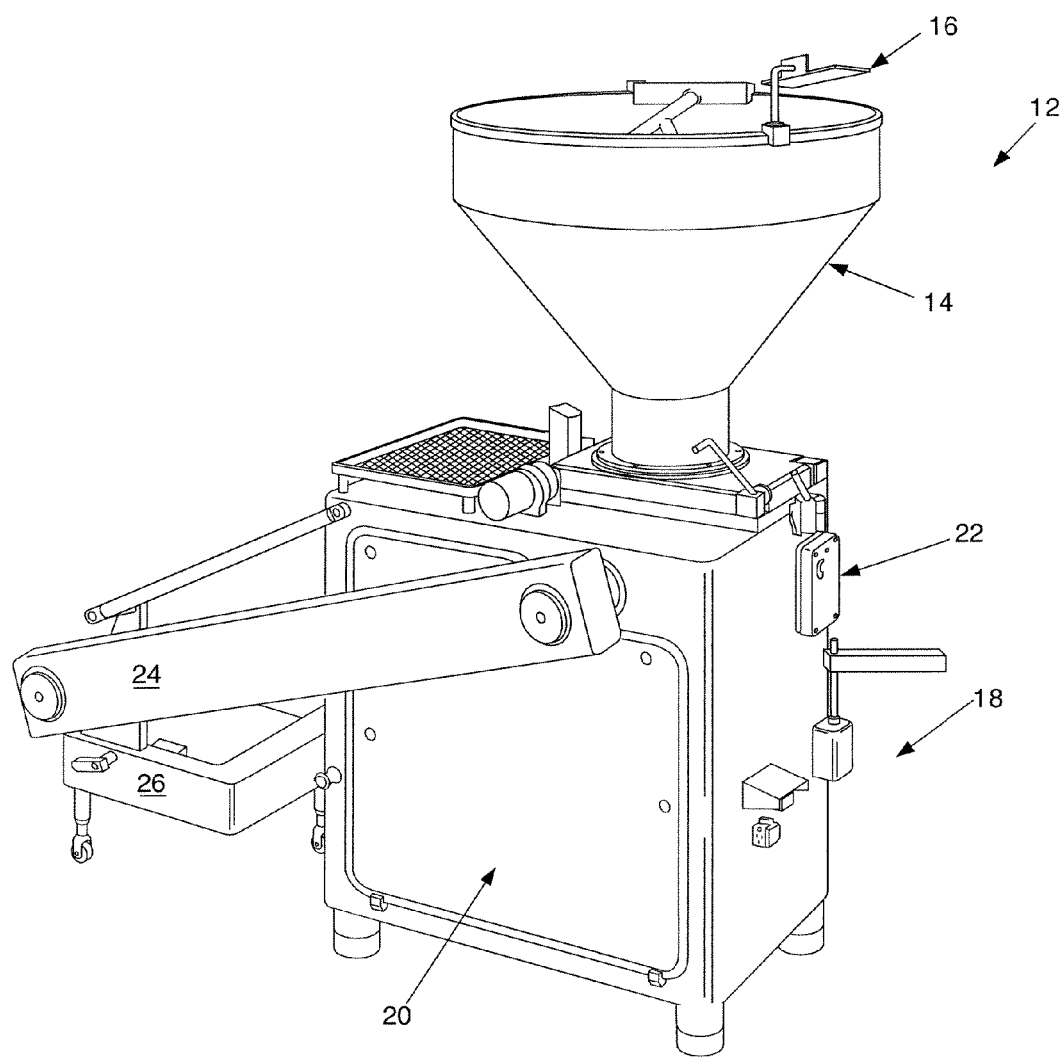
FIG. 2 is a rear perspective view of a pump assembly in accordance with the present invention.

Referring now to FIG. 2, the pump assembly 12 includes a hopper assembly 14 for receiving ground meat. There is a mirror 16 that allows the operator to determine how much ground meat is present in the hopper assembly 14. The hopper assembly 14 is operatively attached to a main displacement assembly 18. There is a feed tube 22 where ground meat is displaced from the pump assembly 12. The main displacement assembly 18 includes a cover 20. There is a loader rail 26 that is capable of being raised by a lift arm 24 to deposit a container of ground meat (not shown) into the hopper assembly 14.

Figure 3:
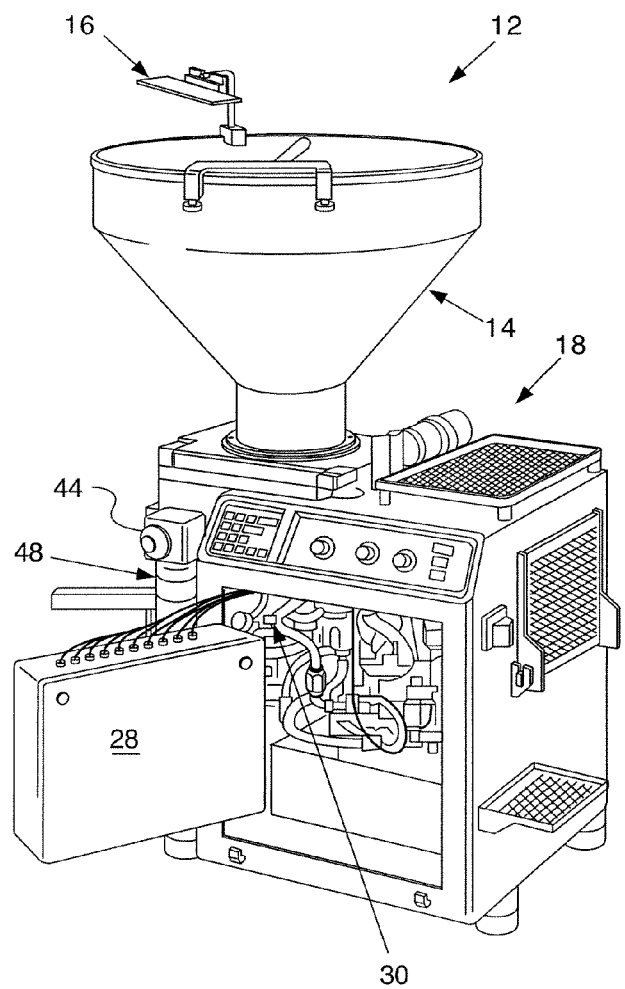
FIG. 3 is a front perspective view of the pump assembly, as shown in FIG. 2, in accordance with the present invention.

Referring now to FIG. 3, the main displacement assembly 18 includes an electronic control 28 and a vacuum pump 30. The electronic control can include a single processor or a whole series of processors and any variant of a processor such as a computer or a programmable logic controller. There is a drive mechanism, e.g., motor, 48 that is operatively connected to a location monitoring mechanism 44. The drive mechanism, e.g., motor, 48 and the location monitoring mechanism 44 are preferably, but not necessarily, rotary-type devices. A wide variety of electrical devices may suffice for the location monitoring mechanism 44; such as but not limited to encoders (preferred) as well as resolvers. The encoders or resolvers can utilize optical, mechanical, or magnetic indexing for angular measurement. This can include rotary encoders (both absolute and incremental), linear encoders, and rotary and angular position sensors. Other devices that may be adapted can include rotary position sensors such as potentiometers (variable resistors) and a wide variety of noncontact magnetic and capacitive technologies.

Figure 3A:
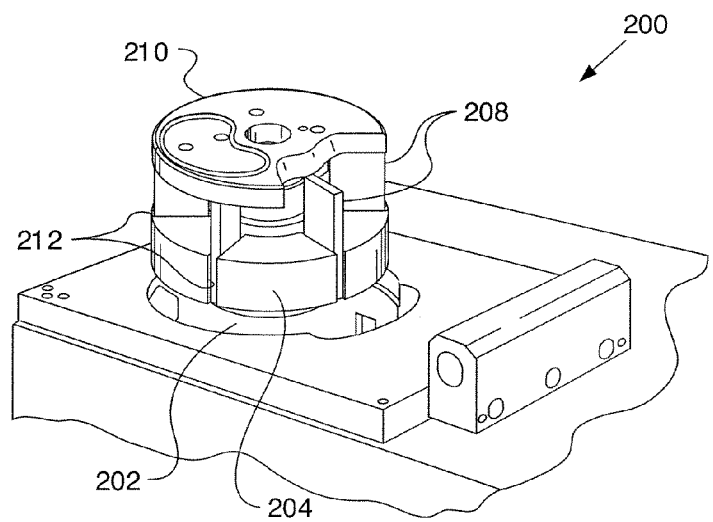
FIG. 3A is an isolated perspective view of rotor and associated drive assembly in accordance with the present invention.

In an illustrative, but nonlimiting example, the drive mechanism, e.g., motor, 202 for the meat pump rotor, as shown in FIG. 3A, is a hydraulic motor operated by oil (not shown). There is a ground meat pump rotor 204 operatively connected to this drive mechanism, e.g., motor, 48 that turns a plurality of vanes 208, e.g., six (6) vanes, using a positive displacement method to force ground meat out the feed tube 22, as shown in FIG. 2. The plurality of vanes 208 is located in corresponding relationship within a plurality of slots 212 located in the ground meat pump rotor 204. Therefore, this pump assembly 12 provides a constant stream of ground meat. This constant stream of ground meat is provided by pulling ground product from the hopper assembly 14 into the plurality of vanes 208 by suction from the vacuum pump 30 and then turning the plurality of vanes 208 forcing ground meat into the feed tube 22. The plurality of vanes 208 is preferably, but not necessarily, made of plastic material.

There is an upper plate 210 to secure the plurality of vanes 208 to the ground meat pump rotor 204. The ground meat is drawn into an assembly 200 of the ground meat pump rotor 204 and the plurality of vanes 208 from the hopper assembly 14, as shown in FIGS. 2 and 3. The speed of the drive mechanism, e.g., motor, 202 is monitored via the location monitoring mechanism 44.

Figure 4:
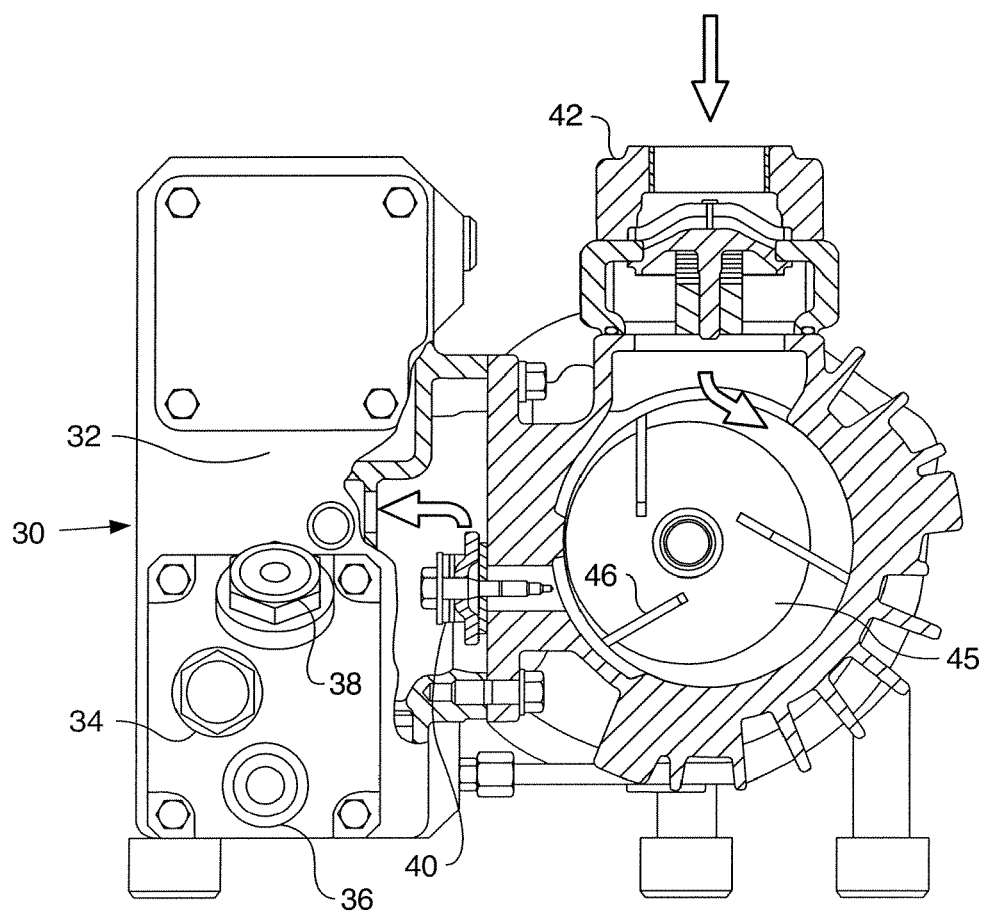
FIG. 4 is a cross-sectional view of the vacuum pump assembly, as shown in FIGS. 2 and 3, in accordance with the present invention.

This vacuum is preferably created by the vacuum pump 30, as shown in FIGS. 3 and 4, and is provided to the assembly 200 that includes the ground meat pump rotor 204 and the plurality of vanes 208 via an exhaust valve 40. The vacuum pump 30 includes a fluid, e.g., oil, separator 32 with a sight glass 34 for observing the level of the fluid, e.g., oil. Also, there is a first plug 36 and a second plug 38 for the fluid, e.g., oil, associated with the vacuum pump 30. The hopper assembly 14, as shown in FIG. 3, is positioned on top of an inlet flange 42, as shown in FIG. 4. The vacuum pump 30 includes a rotor 45 and a plurality of vanes 46, which are positioned between the exhaust valve 40 and the vacuum pump inlet flange 42.

An illustrative, but nonlimiting, example of a pump assembly 12 includes a continuous vacuum filler designated by "RS 5001™ manufactured by Risco S.P.A. having a place of business at Via della Statistica, 2-36016 Thiene, Vicenza, Italy.

The rotary displacement and location of the drive mechanism, e.g., motor, 48 is monitored by the location monitoring mechanism 44 through the electronic control 28. This information is utilized to control the speed of a conveyer 50, as shown in FIG. 1, so the amount of supplied ground meat product can be controlled and predicted using closed loop feedback. Preferably, but not necessarily, this closed loop feedback utilizes proportional feedback.

The conveyor 50 is preferably, but not necessarily, in the form of a cogged timing belt conveyor that operates as a portioner belt. The conveyor 50 is preferably driven by motor (not shown) that rotates in controlled speed and monitored distance. This preferably includes a servo motor; however, stepper motors and other controllable motors will suffice.

Figure 5:
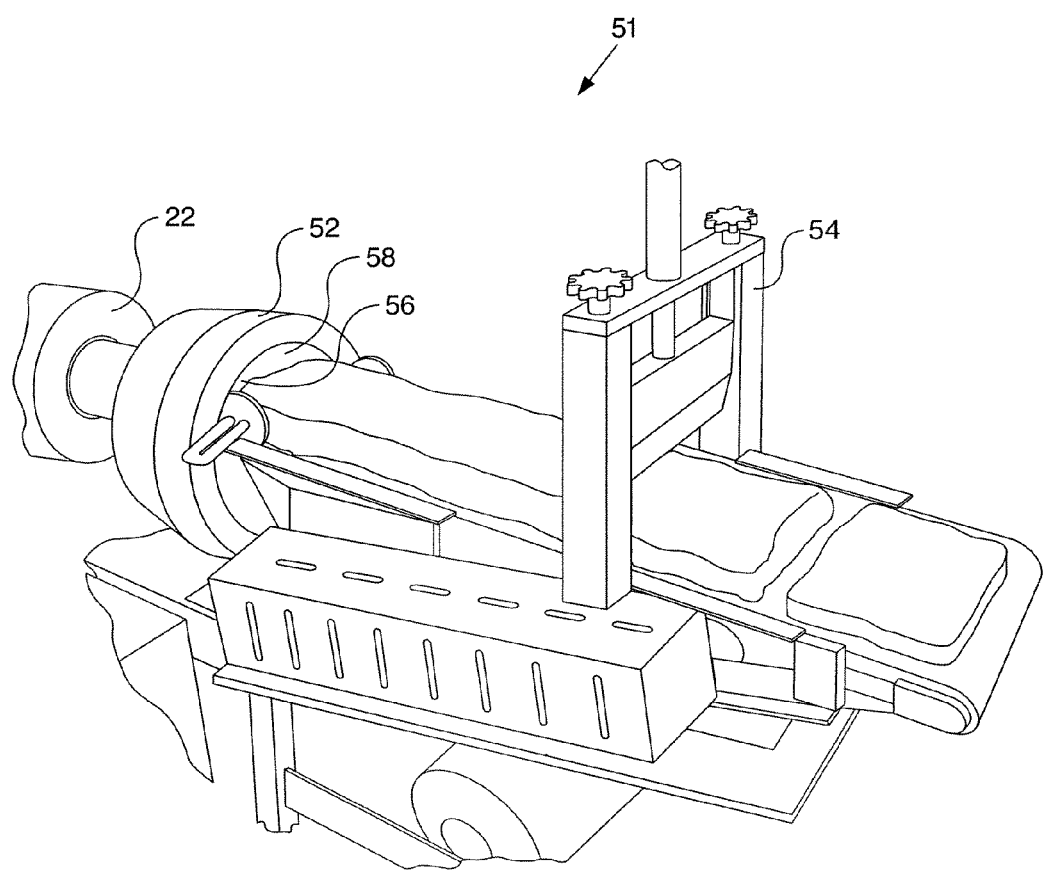
FIG. 5 is a perspective view of an extrusion grinder and guillotine knife in accordance with the present invention.

After the ground meat leaves the feed tube 22, the ground meat enters a portioning mechanism 51 that preferably, but not necessarily, includes an extrusion grinder 52 and a guillotine knife 54 as shown in FIG. 1 and FIG. 5. The extrusion grinder 52 can shape and form the moving ground meat into a consistent shape. Preferably, but not necessarily, the extrusion grinder 52 is controlled to function at a consistent, predetermined speed.

The extrusion grinder 52 utilizes a turning knife 56 and a perforated plate 58 to produce a stream of noodle-shaped, shaped, discrete, ground meat products, as shown in FIG. 5. The guillotine knife 54 is pneumatically powered and electronically controlled to cut the moving ground meat into predetermined lengths of ground meat product.

The stream of ground meat will be sliced into exact length loaves through the use of the guillotine knife 54. The guillotine knife 54 will utilize the measurement of the stream of product from the conveyor 50 to insure actuation when a predetermined length of ground meat has streamed past. When this predetermined length of ground meat has past the guillotine knife 54, the guillotine knife 54 will drop to form a discrete loaf of ground meat product.

Preferably, but not necessarily, the extrusion grinder 52 can be combined with the guillotine knife 54. Illustrative, but nonlimiting, examples include those designated by "RS 900™", "RS 901™" and "RS 902™" which are all manufactured by Risco S.P.A. having a place of business at Via della Statistica, 2-36016 Thiene, Vicenza, Italy.

An array of noodle shaped streams of ground meat product then travel down the conveyor 50. The speed of the conveyer 50 will dictate the density of the ground meat product. In one extreme situation, when the conveyor 50 is either not moving or moving too slow, the ground meat product will collect and eventually create a clog that shuts down the system. In the other extreme situation, with the conveyor 50 moving too fast, the ground meat product can be ripped apart and scattered. The conveyor 50 preferably has a controlled rotation, e.g., servo-controlled, and will be able to provide a predetermined density for the stream of ground meat product.

The electronic control 28, as shown in FIG. 3, will make two adjustments to the speed of the conveyor 50. The first is to adjust the speed of the conveyor 50. The distance that the location monitoring mechanism 44 moves over a predetermined time increment can be divided by the constant distance. This will create a multiplier. This multiplier will then multiply by the base speed to create a final speed of the conveyor 50 that is sensitive to the ground meat output for the pump assembly 12.

Figure 6:
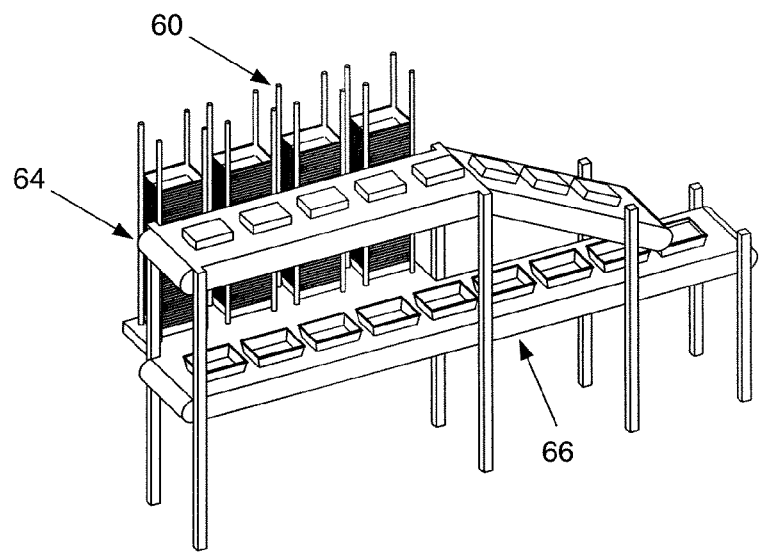
FIG. 6 is a perspective view of a container, e.g., tray, dispenser and denester in accordance with the present invention.

The cut loaves of ground meat will enter a container, e.g., tray, dispenser 60 as shown in FIGS. 1 and 6. The cut loaves of ground meat will then pull away from the stream of ground meat product through the use of a slightly faster belt associated with an accelerated portion 64 of the conveyor 50. An illustrative, but nonlimiting, mechanism to create a faster portion of a conveyor 50 is by a separate endless belt that is moving at a faster, rotational speed. The container dispenser 60 preferably, but not necessarily, includes an automatic denester function for the containers, e.g., trays. The gap that is created between the loaves of ground meat is utilized when dropping the ground meat product into an empty container, e.g., tray.

As shown in FIG. 6, there is an accelerated portion 64 of the conveyor 50 that transports the loaves ground meat over the container dispenser 60. There is a drop belt (not shown) which declines to a horizontal level that comports with that of a container, e.g., tray, provided by the container dispenser 60. Then, the loaf of ground meat will drop into a container, e.g., tray, which is subject to a controlled release at the point where the loaf of ground meat is dropped on a container, e.g., tray, transporting portion 66 of the conveyor 50.

An illustrative, but nonlimiting, example of a container dispenser 60, is a first portion of a Model CVS/VG.1 S 300x700x100™and/or a Model # CVS/VG.1 S 500x700x100™manufactured by Harpak, Inc. having a place of business at 117 Eastman Street, Easton, Mass. 02375.

Figure 7:
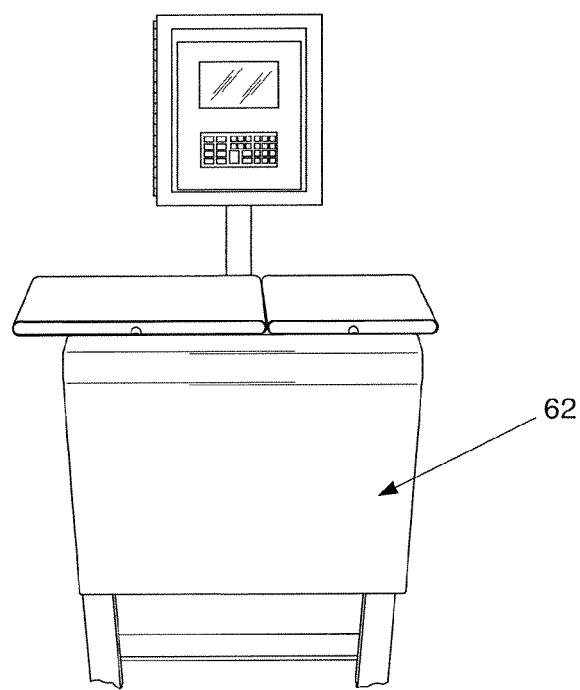
FIG. 7 is a perspective view of an inline scale in accordance with the present invention.

The ground meat product located within a container, e.g., tray, is then run across a weighing mechanism, e.g., an inline scale, 62 as shown in FIGS. 1 and 7. The inline scale 62 weighs the ground meat product located within a container, e.g., tray, to a predetermined precision. The inline scale 62 will then send weight data to the controls for the conveyor 50. The inline scale 62 provides a check weight. An illustrative, but nonlimiting, example of an inline scale includes A.P. Data Weigh Model Number SR11-65K-2CE1-SSX™, which is manufactured by A.P. Dataweigh Systems, having a place of business at 325-D Sharon Industrial Way, Suwanee, Ga, 30024.

As shown in FIG. 1, the second adjustment to the speed of the conveyor 50 is a base speed calculation. A starting point is inputted into the electronic control 28 that is utilized to provide an initial base speed. This base speed will then be adjusted according to output from the inline scale 62. If the inline scale 62 provides an output that is over the target weight of a sample, the variation between the actual weight and the target weight will dictate a linear adjustment in the speed of the conveyor 50. To decrease the density of the ground meat product, there will be a need to accelerate the conveyor 50. In the same manner, if the inline scale 62 provides an output that is under the target weight of a sample, the variation between the actual weight and the target weight will also dictate a linear adjustment in the speed of the conveyor 50. To increase the density of the ground meat product, there will be a need to decelerate the conveyor 50. Due to the speed of the conveyor 50, both measured actual weights and target weights are preferably, but not necessarily, averaged values.

As shown in FIGS. 1, 8 and 9, the containers, e.g., trays, will then proceed to a filling mechanism 68. The filling mechanism 68 includes at least one filling device where a plurality of filling devices is preferred and the optimal number of filling devices being two (2). The filling mechanism 68, depicted in FIGS. 10 and 11 includes a first filling device 72 and a second filling device 74. The first filling device 72 and a second filling device 74 are preferably mounted over a filling conveyor 76, which is mounted to a frame 78.

Preferably, the first filling device 72 and the second filling device 74 operate in alternating sequence so that when the first filling device 72 is being replenished with ground meat, the second filling device 74 can be operating to add ground meat to a container, e.g., tray, of ground meat. Moreover, when the second filling device 74 is being replenished with ground meat, the first filling device 72 can be operating to add ground meat to a container, e.g., tray, of ground meat. This alternating refilling/operation cycle will allow for continuous use of the filling mechanism 68.

As shown in FIG. 9, mounted to the frame 78 is at least one control mechanism for the filling mechanism 68 that is generally indicated by numeral 80 and preferably, but not necessarily, includes a first control mechanism 82, a second control mechanism 84 and a third control mechanism 86.

As shown in FIGS. 8 and 9, the first filling device 72 is removably mounted to a back side of the frame 78 through the use of a first mounting holster 88 and the second filling device 74 is removely mounted to a back side of the frame 78 through the use of a second mounting holster 90. The first mounting holster 88 and the second mounting holster 90, respectively, provide for easy removal and cleaning of the first filling device 72 and the second filling device 74, respectively. Mounted to each side of the filling conveyor 76 is a first guide rail 92 and a second guide rail 94, which both serve to position the container, e.g., tray, underneath the filling mechanism 68.

Referring now to FIGS. 10 and 11, an individual filling device 72 is illustrated as being representative of both the first filling device 72 and the second filling device 74, respectively. There is a supply press 96 that includes a first cylinder, e.g., an air cylinder, 110, as shown in FIGS. 12 and 13, that presses ground meat product into a main chamber 98. When the supply press 96 has pushed ground meat product down into the main chamber 98, a secondary press 100 pushes the ground meat product down into a gating mechanism 102.

Preferably, but not necessarily, the gating mechanism 102 is threadedly attached to a bottom portion of the main chamber 98 and the secondary press 100 is threadedly attached to a top portion of the main chamber 98. The pressure created by the secondary press 100 forces the ground meat product out of an orifice 104 in the gating mechanism 102 in the shape of a noodle.

Referring now to FIGS. 12 and 13, the supply press 96 preferably includes a supply cavity 106, a push plate 108 and the first cylinder, e.g., an air cylinder, 110. A piston 111 for the first cylinder, e.g., an air cylinder, 110 forces the push plate 108 through the supply cavity 106. This action forces the ground meat into the main chamber 98, as shown in FIGS. 10 and 11. An illustrative, but nonlimiting, example of a first cylinder, e.g., an air cylinder, 110 includes CFPM10000A™ manufactured by Numatics Incorporated having a place of business at 1450 North Milford Road; Highland, Mich., 48357-4560; United States of America.

Figure 14:
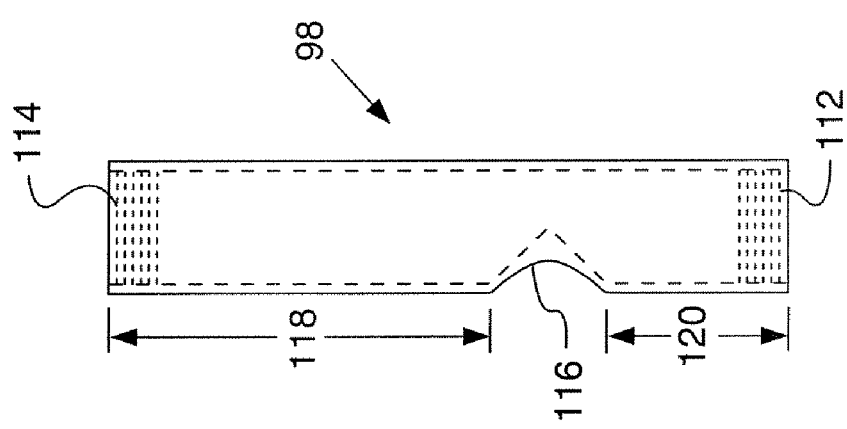
FIG. 14 is an isolated view of a main chamber associated with the filling mechanism in accordance with the present invention.

Referring now to FIG. 14, the main chamber is again indicated by numeral 98. The function of the main chamber 98 is to accept ground meat product from the supply press 96 and house it for pressurization. A lower mounting 112 to attach the main chamber 98 to the gating mechanism 102 is preferably, but not necessarily, a threaded interconnection. An upper mounting 114 to attach the main chamber 98 to the secondary press 100 is preferably, but not necessarily, a threaded interconnection. There is a supply cavity inlet 116 that provides an opening for the supply cavity 106, as shown in FIG. 12. The main chamber 98 includes an upper portion 118 where the piston 111 can be displaced therethrough. Moreover, the main chamber 98 includes a lower portion 120 that operates as a pressure chamber for the main chamber 98.

Referring now to FIGS. 15 and 16, the secondary press is again indicated by numeral 100. The secondary press 100 includes a second cylinder, e.g., an air cylinder, 122 that is attached to a holding cap 124. The holding cap 124 can be of virtually any geometric shape with the preferred shape being cylindrical. Attachment can occur between the second cylinder, e.g., an air cylinder, 122 and the holding cap 124 through a variety of mechanisms and preferably through interconnected threaded portions 126 and 128, respectively, to hold the second cylinder, e.g., an air cylinder, 122 in place.

There is a piston 130 that is connected to the second cylinder 122. This preferably occurs via interconnected threaded portions 152 and 154, respectively. The second cylinder, e.g., an air cylinder, 122 is then able force the piston 130 into the main chamber 98 to pressurize the ground meat product and force it down and out of the outlet 104 for the gating mechanism 102, as shown in FIGS. 10 and 11. An illustrative, but nonlimiting, example of second cylinder, e.g., an air cylinder, 122 includes 3000D02-12A-03™ manufactured by Numatics Incorporated having a place of business at 1450 North Milford Road; Highland, Mich., 48357-4560; United States of America.

Figure 17:
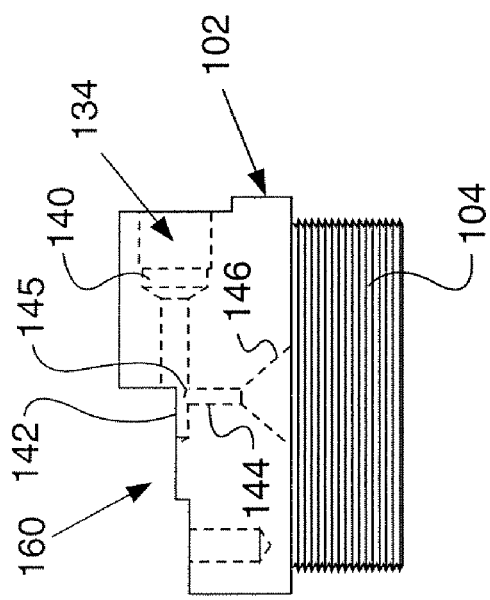
FIG. 17 is a cross-sectional view of a gating mechanism associated with the filling mechanism in accordance with the present invention.
Figure 18:
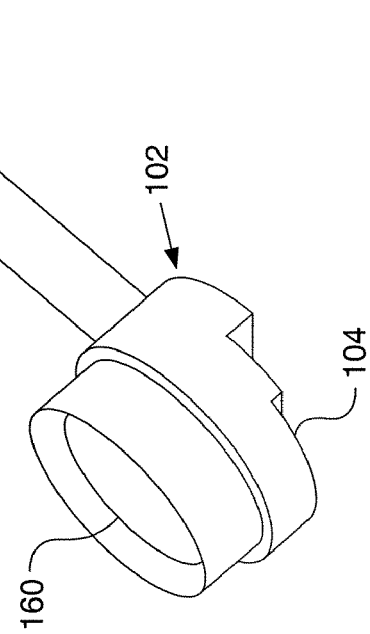
FIG. 18 is a perspective view of a gating mechanism associated with the filling mechanism in accordance with the present invention.
Figure 19:
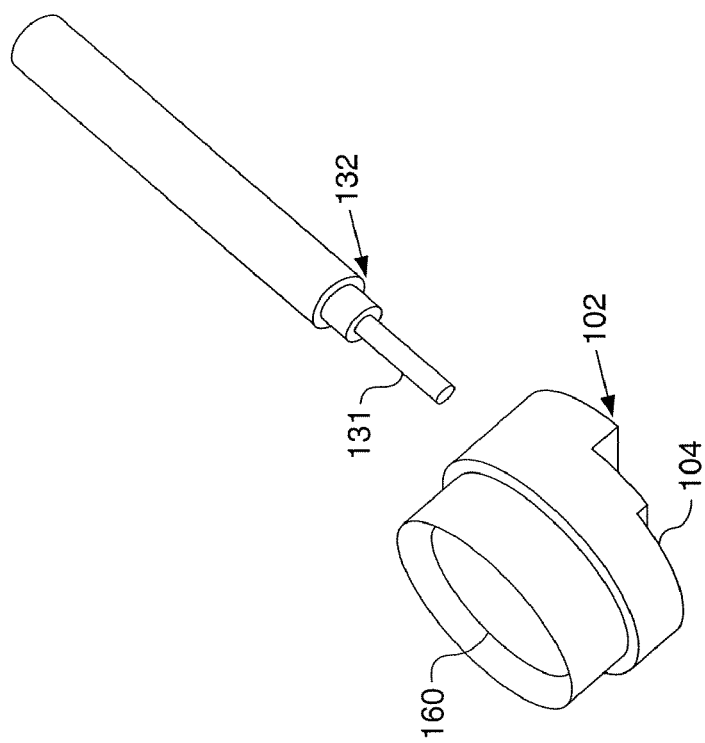
FIG. 19 is an exploded view of the gating mechanism, as shown in FIG. 18, associated with the filling mechanism in accordance with the present invention.

Referring now to FIGS. 17, 18 and 19, the gating mechanism 102 includes an inlet 160 that is capable of receiving ground meat from the main chamber 98. There is a third cylinder, e.g., an air cylinder, 132 that is connected to the gating mechanism 102 through a first orifice 134. There is a rod 131 for the third cylinder, e.g., an air cylinder, 132 that is capable of selectively blocking the first orifice 134, as shown in FIG. 17. The first orifice 134 is connected in fluid relationship to the inlet 160 and the outlet 104. There are a wide variety of geometric shapes that may suffice for the first orifice 134. The first orifice 134 is preferably, but not necessarily, in the shape of first cylindrical portion 140 having a larger diameter than a second cylindrical portion 142. Also, there are a wide variety of geometric shapes that may suffice for the outlet 104. Preferably, but not necessarily, the outlet 104 includes a cylindrical portion 144 that is connected to an inverted conical portion 146, thereby functioning as a funnel-type of device. The point where the inlet 160, the first orifice 134 and the outlet 104 intersect is indicated by numeral 145.

The rod 131 of the third cylinder, e.g., an air cylinder, 132 enters the first orifice 134 into both the first cylindrical portion 140 and the second cylindrical portion 142 to block the inlet 160 from the outlet 104 at the intersection 145 to prevent ground meat from exiting the gating mechanism 102 and leaving the inlet 160. By retracting the rod 131 of the third cylinder, e.g., an air cylinder, 132 from the first orifice 134, including both the first cylindrical portion 140 and the second cylindrical portion 142, the gating mechanism 102 is able to allow ground meat to enter the inlet 160 from the main chamber 98 and exit the outlet 104. By controlling the amount of time that the outlet orifice 104 is open in correspondence with input from the inline scale 62 allows for a controlled fill of ground meat to each container to provide an additional fill of ground meat. This additional fill of ground meat is to achieve what is substantially an exact weight for each container, e.g., tray, of ground meat product.

The third cylinder, e.g., an air cylinder, 132 is electrically controlled by the at least one control mechanism for the filling mechanism 68, e.g., first control mechanism 82, second control mechanism 84 and third control mechanism 86 for selectively moving the piston in and out of the gating mechanism 102. An illustrative, but nonlimiting, example of third cylinder, e.g., an air cylinder, 132 includes CFPM10000B™ manufactured by Numatics Incorporated having a place of business at 1450 North Milford Road; Highland, Mich., 48357-4560; United States of America. The cylinders 110, 122 and 132 are preferably air but can be activated by a wide variety of fluids as well as electro-mechanical and mechanical activation.

Figure 20:
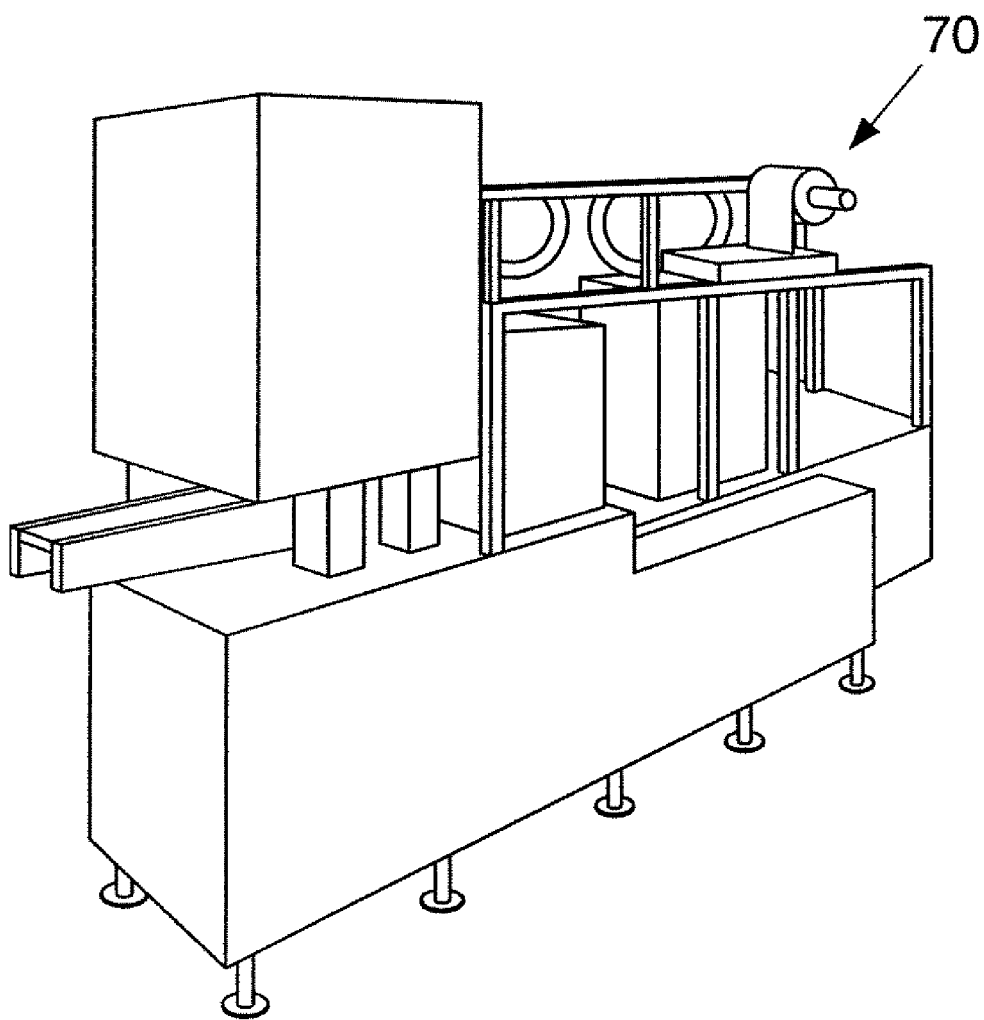
FIG. 20 is a perspective view of a container, e.g., tray, sealing mechanism in accordance with the present invention.

After the filling process is complete, the container, e.g., tray, of ground meat having a substantially exact predetermined weight is passed into a container sealing mechanism 70, as shown in FIGS. 1 and 20. A typical container-sealing mechanism is able to apply a material, typically thermoplastic material, to seal the top of the container, e.g., tray, to prevent contamination of the ground meat. Sealing can occur under a vacuum, with a gas flush, and so forth. This is to allow the ground meat product to maintain freshness for as long as possible. An illustrative, but nonlimiting, example of a container sealing mechanism 70, is the second portion of a Model CVS/VG.1 S 300x700x100™ and/or a Model # CVS/VG.1 S 500x700x100™ manufactured by Harpak, Inc. having a place of business at 117 Eastman Street, Easton, Mass. 02375.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

The invention claimed is:

1. A system for producing portions of ground meat having a predetermined target weight comprising:
   a pump assembly that is capable of extruding a stream of ground meat;
   a conveyor that is capable of transporting the stream of ground meat from the pump assembly;

a portioning mechanism that is capable of separating the stream of ground meat into a plurality of portions;

a weighing mechanism that is capable of weighing each portion of the plurality of portions; and at least one filling mechanism that provides an additional amount of ground meat to each portion of the plurality of portions so that each portion of the plurality of portions can substantially attain the predetermined target weight.

2. The system for producing portions of ground meat having a predetermined target weight according to claim 1, wherein the pump assembly includes a hopper assembly capable of receiving ground meat and a main displacement assembly.

3. The system for producing portions of ground meat having a predetermined target weight according to claim 2, wherein the main displacement assembly includes a vacuum pump capable of applying a vacuum to ground meat located in the hopper assembly.

4. The system for producing portions of ground meat having a predetermined target weight according to claim 2, wherein the main displacement assembly includes a drive mechanism operatively connected to a plurality of rotatable vanes capable of moving ground meat out of a feed tube and onto the conveyor.

5. The system for producing portions of ground meat having a predetermined target weight according to claim 4, wherein the drive mechanism includes a motor operatively connected to a rotor.

6. The system for producing portions of ground meat having a predetermined target weight according to claim 4, wherein the drive mechanism includes a motor that is operatively connected to a location monitoring mechanism and the location monitoring mechanism is electrically connected to an electronic control, wherein the electronic control is able to control speed of the conveyor based on input from the location monitoring mechanism.

7. The system for producing portions of ground meat having a predetermined target weight according to claim 6, wherein the electronic control utilizes closed loop feedback to provide a speed for the conveyor that is responsive to an output of ground meat from the pump assembly.

8. The system for producing portions of ground meat having a predetermined target weight according to claim 6, wherein the location monitoring mechanism is selected from the group consisting of an optical encoder, a mechanical encoder, a magnetic indexing encoder, an optical resolver, a mechanical resolver, a magnetic indexing resolver, an absolute rotary encoder, an incremental rotary encoder, a linear encoder, a rotary position sensor, an angular position sensor, a potentiometer, a noneontact magnetic sensor and a capacitive sensor.

9. The system for producing portions of ground meat having a predetermined target weight according to claim 1, further comprising an electronic control that is operatively connected to the conveyor, whereby the electronic control is capable of controlling the speed of the conveyor and density of the stream of ground meat.

10. The system for producing portions of ground meat having a predetermined target weight according to claim 9, wherein the conveyor is servo-controlled.

11. The system for producing portions of ground meat having a predetermined target weight according to claim 1, wherein the portioning mechanism includes an extrusion grinder.

12. The system for producing portions of ground meat having a predetermined target weight according to claim 1, wherein the portioning mechanism includes a guillotine knife.

13. The system for producing portions of ground meat having a predetermined target weight according to claim 1, further comprising a container dispenser positioned after the portioning mechanism over the conveyor that is capable of placing each portion of the plurality of portions into a separate container.

14. The system for producing portions of ground moat having a predetermined target weight according to claim 13, wherein the conveyor includes an accelerated portion for separating the portions of ground meat and a decelerated portion located underneath the container dispenser.

15. The system for producing portions of ground meat having a predetermined target weight according to claim 13, further comprising a container sealing mechanism located after the at least one filling mechanism for sealing ground meat within each of the separate containers.

16. The system for producing portions of ground meat having a predetermined target weight according to claim 1, further comprising an electronic control that is capable of receiving at least one weight measurement from each of the plurality of portions of ground meat with the weighing mechanism and comparing the weight measurements with a target weight, wherein the electronic control is able to increase the speed of the conveyor if the at least one weight measurement is greater than the target weight and decrease the speed of the conveyor if the at least one weight measurement is less than the target weight.

17. The system for producing portions of ground meat having a predetermined target weight according to claim 1, further comprising an electronic control that is capable of receiving a plurality weight measurements from the plurality of portions of ground meat with the weighing mechanism and comparing an average weight measurement with a target weight, wherein the electronic control is able to increase the speed of the conveyor if the average weight measurement is greater than the target weight and decrease the speed of the conveyor if the average weight measurement is less than the target weight.

18. The system for producing portions of ground meat having a predetermined target weight according to claim 1, wherein the weighing mechanism includes an inline scale.

19. The system for producing portions of ground meat having a predetermined target weight according to claim 1, wherein the at least one filling mechanism includes a supply press that is operatively attached to a main chamber, having an upper portion and a lower portion, wherein the supply press is capable of injecting ground meat into the main chamber and a secondary press that is operatively connected to the upper portion of the main chamber, wherein the secondary press is capable of applying pressure to ground meat located within the main chamber and a gating mechanism that is operatively connected to the lower portion of the main chamber and is capable of selectively releasing an additional amount of ground meat into each portion of the plurality of portions.

20. The system for producing portions of ground meat having a predetermined target weight according to claim 19, wherein the supply press includes a first cylinder having a piston located within the first cylinder and capable of applying pressure to a push plate located within a supply cavity, wherein the push plate is capable of supplying ground meat to within the main chamber.

21. The system for producing portions of ground meat having a predetermined target weight according to claim 19, wherein the secondary press includes a holding cap, having a top portion and a bottom portion, wherein a second cylinder is operatively attached to the top portion of the holding cap and a piston is operatively attached to the second cylinder, wherein the piston is capable of moving within the upper portion of the main chamber and is capable of applying pressure to ground meat located within the main chamber.

22. The system for producing portions of ground meat having a predetermined target weight according to claim 19, wherein the gating mechanism includes an inlet, an cutlet and a third cylinder, having a piston, and an orifice located in between the inlet and the outlet and in fluid communication therewith, wherein the piston is able to enter the orifice to selectively block passage of ground meat between the inlet and the outlet of the gating mechanism.

23. The system for producing portions of ground meat having a predetermined target weight according to claim 22, further comprising a control mechanism that is electrically connected to the third cylinder to selectively move the piston to control an additional fill of ground meat into each portion of the plurality of portions.

24. The system for producing portions of ground meat having a predetermined target weight according to claim 1, wherein the at least one filling mechanism includes a first filling mechanism that is removedly mounted in a first holster and a second filling mechanism tat is removedly mounted in a second holster, wherein the first filling mechanism and the second filling mechanism alternately operate in sequence and are positioned over a filling conveyor.

* * * * *